Patented Nov. 13, 1945

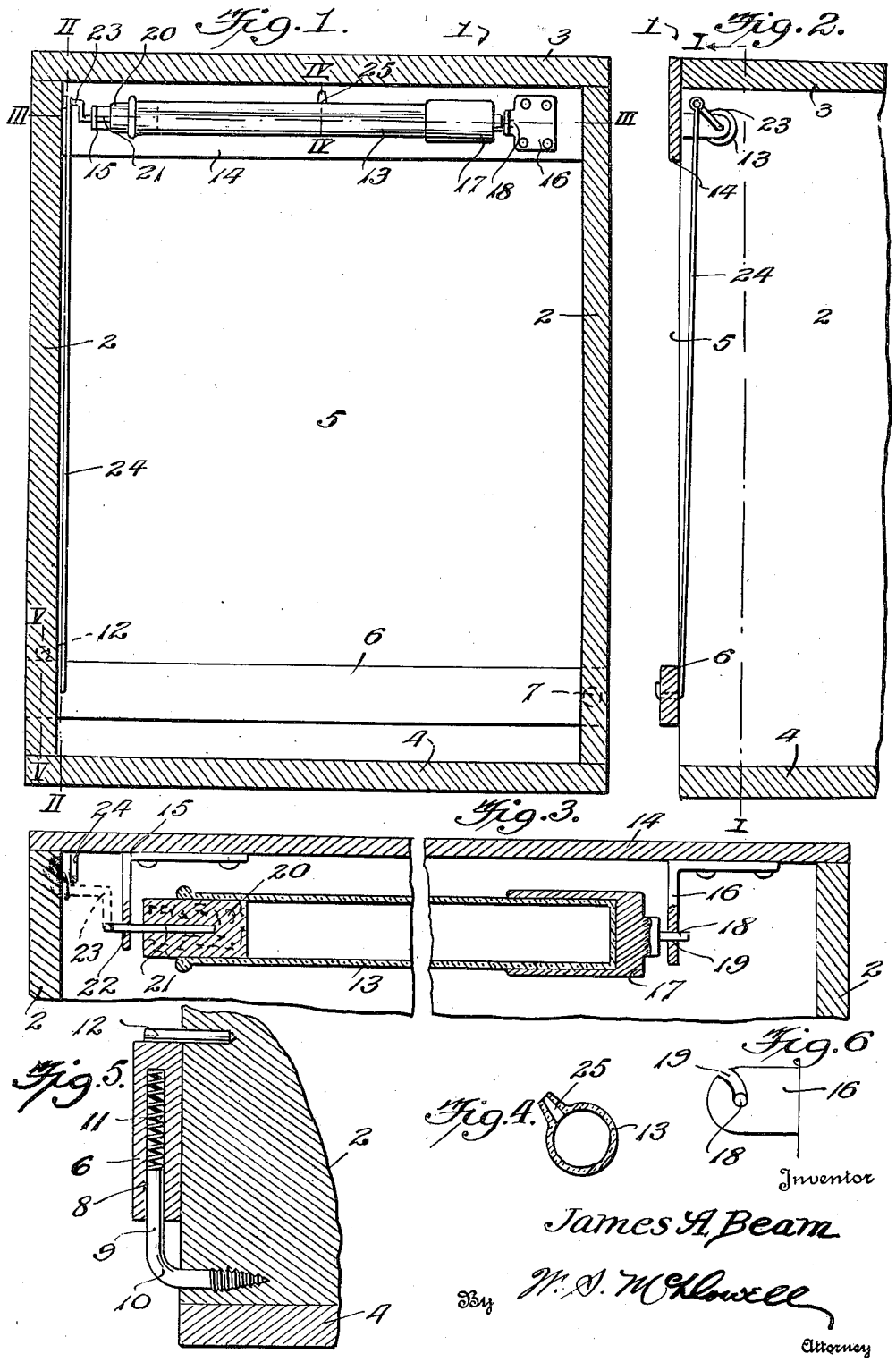

2,388,898

UNITED STATES PATENT OFFICE 2,388,898

APPARATUS FOR MARKING EGG-LAYING HENS

James A. Beam, Mount Vernon, Ohio

Application February 8, 1943, Serial No. 475,231

2 Claims. (Cl. 119—45)

This invention provides an improvement in the construction of hens' nests. More specifically, the present invention provides a hen's nest having an entrance equipped with apparatus by which a pigmented marking fluid is dropped in limited quantities on the back of a hen as the latter enters or leaves the nest.

Poultry raisers having large flocks of hens are often at a loss to know which hens to separate and sell for meat-supplying purposes from those which should be retained for their egg laying capacities. At present, this is difficult to ascertain. It is known that the hens which lay eggs use nests provided for that purpose, while the non-laying hens, as a general rule, do not enter such nests.

Accordingly, the present invention provides a hen's nest wherein the entrance to the nest has formed at the top thereof a movably mounted receptacle which receives a pigmented fluid. At the bottom of the nest, there is provided a movable bar which the hen engages when entering or leaving the nest. The hen, upon engaging the bar, depresses the latter against spring resistance and this movement of the bar is utilized to effect movement of the fluid-containing receptacle, so that a limited quantity of the pigmented fluid contained within the receptacle will be released in a downward direction, the same being distributed in the form of droplets on the back of a hen, whereby through the coloration of the fluid, a poultry raiser may, at a glance, determine which hens are using the nests and which are not, thereby enabling the egg-laying hens to be readily distinguished from the non-laying hens.

For a further understanding of the invention, reference is to be had to the following description and the accompanying drawing, wherein:

Fig. 1 is a vertical transverse sectional view taken through the entrance of a hen's nest formed in accordance with the present invention, the plane of the figure being indicated by the line I—I of Fig. 2;

Fig. 2 is a vertical longitudinal sectional view taken on the plane indicated by the line II—II of Fig. 1;

Fig. 3 is a horizontal sectional view taken through the mounting for the liquid-containing receptacle, the plane of the figure being indicated by the line III—III of Fig. 1;

Fig. 4 is a vertical transverse sectional view taken through the liquid-containing receptacle on the line IV—IV of Fig. 1;

Fig. 5 is a detail vertical sectional view on the line V—V of Fig. 1 and illustrating the resilient supporting means for the movable bar;

Fig. 6 is a detail view of one of the brackets employed in effecting the rotatable support of the liquid-containing receptacle.

Referring more particularly to the drawing, the numeral 1 designates the entrance portion of a hen's nest, the latter comprising vertical side panels 2, a top wall 3 and a horizontal bottom wall 4, the front of the nest being open as at 5 to constitute an entrance.

Disposed contiguous to the bottom of the nest at the front thereof is a transversely and horizontally extending bar 6. This bar at one end is pivoted as at 7 in connection with one of the side panels 2, and the opposite end of said bar is formed with a vertical socket 8. Entering the open bottom of this socket is the upstanding vertical portion 9 of a screw member 10, the threaded end of the latter being received within one of the side panels 2, as shown in Fig. 5. Positioned in the socket 8 is a coil spring 11, which engages with the closed upper end of the socket and with the upper end of the vertical portion 9 of the screw member 10. Normally, the spring maintains the upper edge of the bar 6 in contact with a stationary stop pin 12, which projects horizontally and laterally from the front edge of one of the panels 2.

It will be seen that as a hen enters or leaves the nest 1, the engagement of the hen with the bar 6 will be such as to depress the bar, rocking the same about its pivotal axis 7 and depressing the bar against resistance of the spring 11. This movement of the bar is utilized for the purpose of operating a movable liquid-containing receptacle in order to distribute a pigmented fluid on the back of the hen.

The simple mechanism for accomplishing this purpose comprises a cylindrical liquid-holding bottle or receptacle 13, which is mounted for horizontal oscillatory movement contiguous to the upper part of the nest and above the entrance opening 5. Thus, the top of the nest may be provided with a horizontally extending stationary bar 14, the back of which is provided with a pair of shade-roller brackets 15 and 16 by means of which the receptacle 13 is movably supported. Surrounding the closed end of the receptacle 13 is a journalling sleeve 17 which is formed axially with a pintle 18, the latter being rotatably and removably received within a slot 19 provided in the bracket 16. The open end of the receptacle is adapted to be closed by a removable stopper 20. This stopper carries axially a rod 21 which is journaled in the slot 22 of the bracket 15. The rod 21 terminates in a crank extension 23, with which is connected the upper end of a wire rod 24, the lower end of the latter being connected with the movable end of the actuating bar 6.

In view of the foregoing, it will be seen that when a hen enters or leaves the nest through its open front 5, the hen upon engaging the actuating bar 6 will cause the latter to be depressed against the resistance offered by the spring 11. The resulting downward movement of the actuating bar pulls downwardly on the rod 24 which, by being connected with the crank extension 23, effects the partial rotation of the liquid-containing receptacle 13. This receptacle may be filled with a fluid containing a suitable pigment, for example, potassium permanganate in solution, and the receptacle is formed, at a position approximately in registration with the center of the nest, with a restricted outlet nozzle 25. Normally, this nozzle is maintained in an upward direction as shown in Fig. 4, by the action of the spring 11 associated with the bar 6. However, when said bar is depressed, the receptacle 13 is partially rotated to direct the nozzle 25 downwardly, which causes limited release of the pigment fluid from the bottle in the form of droplets, these droplets being directed downwardly in order to strike the back of the hen. The hens using the nest are thus distinctively colored, so that the poultry raiser may, at a glance, determine the hens which are using such nests, and thereby distinguish egg-laying hens from the non-laying hens in a given flock.

The receptacle 13 is readily removable from its supporting brackets in order that the same may be filled from time to time with the pigment fluid. The apparatus is characterized by its mechanical simplicity and manufacturing economy and its ability to perform the operations herein described in a thoroughly effective manner.

I claim:

1. Hen-marking apparatus for use in conjunction with a nest having an upright frame in which is provided an entrance opening, a horizontally disposed receptacle adapted for the reception of a pigmented fluid, said receptacle having a restricted fluid outlet formed in its side wall intermediately of the ends thereof, pintle means projecting axially from the ends of said receptacle for effecting its rotatable support in conjunction with the nest frame above said entrance opening, supports carried by said frame in which said pintles are removably journaled, a bar pivotally mounted at one end on the nest frame and extending across said entrance opening contiguous to the bottom of the latter, the free end of said bar being provided with a socket, a stop member carried by said frame and having a vertical portion receivable within said socket, a coil spring positioned between the closed end of said socket and the upper end of the vertical portion of said stop member, whereby to provide a resilient support for the movable end of said bar, and a connection between said bar and one of said pintles for rotating said receptacle when the bar is depressed by the weight of a hen engaging the same, whereby to oscillate said receptacle to a position in which the fluid outlet thereof is directed downwardly.

2. Hen-marking apparatus comprising a nest having an upright frame in which is provided an entrance opening, a horizontally disposed fluid storage and dispensing receptacle adapted for the reception of a pigmented fluid, said receptacle having a restricted fluid outlet formed in its side wall intermediately of the ends thereof, a cup member in which one end of said receptacle is positioned, said cup member being formed with an axially disposed pintle, a removable closure member receivable in the other end of said receptacle, said closure member being provided with an axially disposed pintle, bracket supports carried by said frame in which said pintles are removably received to effect rotational support of said receptacle about its longitudinal axis, a crank extension formed with one of said pintles, a treadle bar pivoted to said nest frame and extending across said entrance opening for engagement by a hen entering or leaving the nest, spring means for resisting movement of said bar, and a link uniting the free end of said bar with said crank extension.

JAMES A. BEAM.